United States Patent

Mahefkey, Jr.

[11] Patent Number: 4,581,285
[45] Date of Patent: Apr. 8, 1986

[54] HIGH THERMAL CAPACITANCE MULTILAYER THERMAL INSULATION

[75] Inventor: Edward T. Mahefkey, Jr., Beavercreek, Ohio

[73] Assignee: The United States of America as represented by the Secretary of the Air Force, Washington, D.C.

[21] Appl. No.: 501,944

[22] Filed: Jun. 7, 1983

[51] Int. Cl.⁴ ............................................. B32B 15/00
[52] U.S. Cl. ................................... 428/285; 220/450; 220/452; 428/284; 428/432; 428/457; 428/458; 428/920
[58] Field of Search ............... 428/285, 432, 457, 920, 428/284, 458; 220/400, 450, 452

[56] References Cited

U.S. PATENT DOCUMENTS

| | | | |
|---|---|---|---|
| 3,082,611 | 3/1963 | Alvis et al. | 62/217 |
| 3,122,883 | 3/1964 | Terner | 60/35.6 |
| 3,799,056 | 3/1974 | Colignon | 102/105 |
| 4,278,716 | 7/1981 | Buchner et al. | 428/458 |
| 4,323,620 | 4/1982 | Iwabuchi et al. | 428/432 |
| 4,369,222 | 1/1983 | Hedrick et al. | 428/458 |

FOREIGN PATENT DOCUMENTS 760611 2/1955 United Kingdom ............... 428/458

Primary Examiner—James J. Bell
Attorney, Agent, or Firm—Donald J. Singer; Bobby D. Scearce

[57] ABSTRACT

A high thermal capacitance multilayer thermal insulation structure is described, which is of particular utility for thermal protection against exposure to alternate high and low radiant heat flux levels, and which comprises a laminate of alternate metal foil or metallized plastic foil layers and layers of material which are characterized by phase change upon the absorption of heat, the foil layers providing high reflectance and reradiation of the heat flux, and the phase change layers providing for absorption and storage of heat during periods of high heat flux for reradiation during periods of low heat flux.

14 Claims, 4 Drawing Figures

HIGH THERMAL CAPACITANCE MULTILAYER THERMAL INSULATION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to thermally protective and insulative covering for components, and more particularly to a novel layered covering structure for the thermal protection of heat sensitive components and cryogenic storage vessels against the effects of periodic exposure to alternate high and low radiant heat fluxes.

In the efficient operation of spacecraft, such as orbiting satellites or the like, thermal insulation for heat sensitive components may be essential. The requirement for suitable thermal protection may be particularly important in orbiting satellites or other vehicles subjected to the extreme hot and cold of an orbit which cyclically exposes the vehicle to the sun and to the umbra of the earth.

Conventional thermal insulative coverings may consist of a multilayer structure of alternate layers of metal foil and ceramic or fibrous spacers. This structure is characterized by low thermal capacity and high conductive/radiative resistance, and a very low effective thermal conductivity. For applications involving unsteady or periodic high and low heat transfer, such as that experienced by an orbiting vehicle, the heat leak through the insulative covering structure will be substantially affected not only by the thermal conductivity value characterizing the insulative structure, but also on its thermal capacity. Conventional thermal insulation coverings used, for example, to insulate tanks containing cryogens as propellant reactants aboard an orbiting vehicle, allow approximately 0.1% per day loss of cryogen by reason of heat leak and resultant boil-off loss.

The novel insulative covering of the present invention provides substantially improved heat leak characteristics under conditions of periodic exposure to and removal of a heat flux thereon, of particular utility for the protection of heat sensitive systems or cryogen tankage aboard orbiting vehicles. The structure of the covering comprising the invention includes a plurality of alternate layers of metal foil and heat absorbing phase change material as the outer layers of the structure. The structure is therefore characterized by optimum thermal conductivity to thermal capacity ratio (i.e., thermal diffusivity) to minimize the heat transfer through the insulation during periods of exposure to high heat flux, by absorption of heat in the outer layers comprising the phase change material. The stored heat may be reradiated to deep space during periods of no (or low) heat flux exposure. Use of the present invention for orbiting vehicle thermal control or cryogen storage tank protection allows reduction in weight of required insulation and, most importantly, substantial reduction in heat leak to the protected components. The reduction in cryogen boil-off may allow significant extension of vehicle orbit lifetime.

It is therefore a principal object of the present invention to provide an improved thermal insulation structure.

It is a further object of the invention to provide an improved insulation structure for the protection of heat sensitive components exposed alternately to high and low heat flux levels.

These and other objects of the present invention will become apparent as the detailed description of representative embodiments proceeds.

SUMMARY OF THE INVENTION

In accordance with the foregoing principles and objects of the present invention, a high thermal capacitance multilayer thermal insulation structure is described, which is of particular utility for thermal protection against exposure to alternate high and low radiant heat flux levels, and which comprises a laminate of alternate metal foil or metallized plastic foil layers and layers of material which are characterized by phase change upon the absorption of heat, the foil layers providing high reflectance and reradiation of the heat flux, and the phase change layers providing for absorption and storage of heat during periods of high heat flux for reradiation during periods of low heat flux.

DESCRIPTION OF THE DRAWINGS

The present invention will be more clearly understood from the following description of specific embodiments thereof read in conjunction with the accompanying drawings wherein.

DETAILED DESCRIPTION

Figure 1:
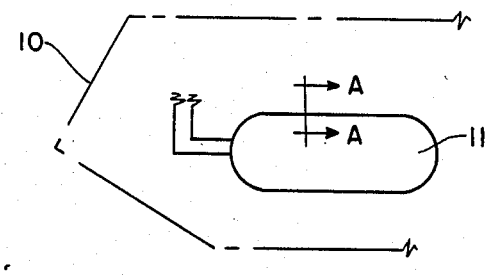
FIG. 1 is a schematic illustration of a system for which the insulative covering of the present invention may be applicable.

Referring now to the drawings, FIG. 1 illustrates schematically a satellite 10 or the like (shown in phantom) aboard which a system requiring thermal insulation protection may be carried. Such a system may be represented by tank 11 configured to contain cryogens, such as liquid oxygen, hydrogen, helium and the like, useful aboard the satellite 10 for coolant, propellant, or other familiar operational purposes. It is understood that the insulative structure herein described may be suitable for the protection of other systems, such as those including thermally sensitive optical and electronic components, which general use is contemplated hereunder.

Figure 2:
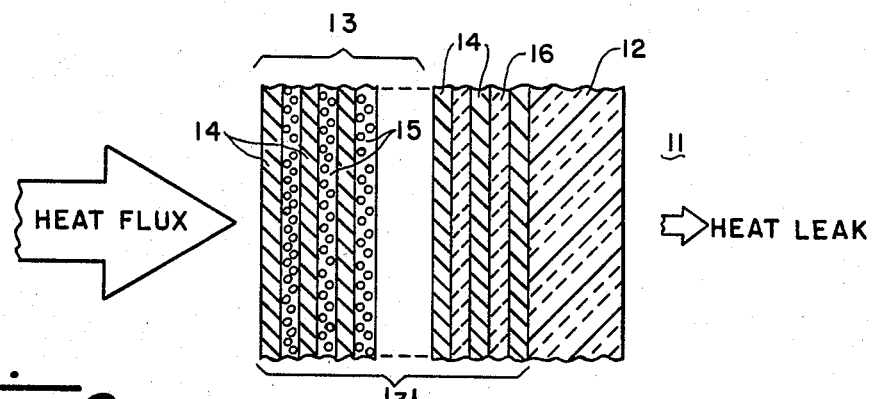
FIG. 2 is a cross section on an enlarged scale of the novel layered insulative structure of the present invention.

FIG. 2 is a sectional view of the tank 11 of FIG. 1 such as along lines A—A, showing the novel insulative blanket structure of the present invention applied to the outer surface of tank 11. Tank 11 may have a wall 12 structure which is itself also thermally insulative, such as would be represented by an evacuated double wall construction or other conventional thermally insulative structures. Shown adjacent the outer surface of wall 12 of tank 11 is the high capacitance multilayer structure of the insulative covering 13 of the present invention. In its preferred form, covering 13 comprises a laminate of a plurality of alternate layers of metalized foil or metal foil 14 and layers 15 including a phase change material which may be encapsulated in a suitable matrix. Metal foil layers 14 serve as radiation shields and preferably comprise metals or metallized plastic films characterized by high surface emissivity and low heat absorptivity. Accordingly, metal foils comprising nickel, tungsten, molybdenum, aluminum, silver, or gold, may be preferred although other metal foils may be acceptable. Mylar TM and Kapton TM films (0.00015 to 0.001 inch thick) typically may be the plastic substrate material supporting a metallized layer. Foil layers 14 will, in the structure described herein, usually have thickness ranging from about 0.005 inch to about 0.020 inch.

Figures 3A, 3B:
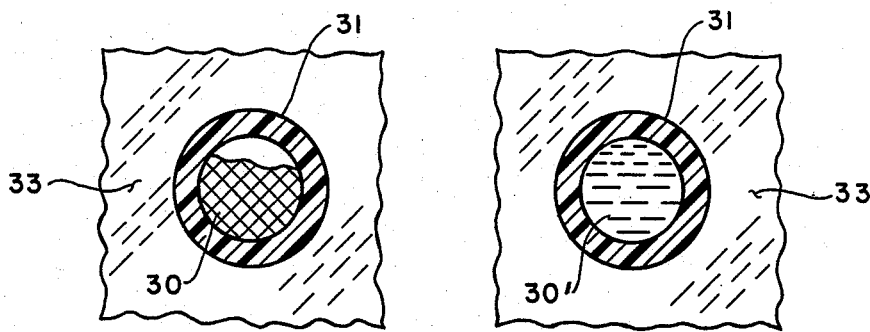
FIGS. 3a and 3b are schematic cross sections on a substantially enlarged scale of a representative encapsulated phase change material usable within the layered structure of the present invention.

Layers 15 comprise phase change material and serve as heat absorbing layers to substantially reduce the conduction of heat inward through the insulating covering structure to tank 11. Layers 15 comprise a material characterized by transition from a first phase to a second phase upon absorption of heat, as when insulative covering 13 is exposed to high heat flux, and by transition from the second phase back to the first phase upon radiation of the stored heat during periods of low heat flux. Layers 15 may therefore preferably comprise solid-to-liquid phase change materials, such as n-paraffin waxes, bee's wax, 1-decanol octadecane, sodium thiosulfate pentahydrate, calcium chloride hydrate, or other hydrated salts, or solid-solid phase change materials, such as neutron irradiated form stable cross-linked nylon, and other high density polyethylene compounds which exhibit favorable energy storage per unit volume and unit mass. In applications wherein substantial heat absorption may be anticipated, other (higher temperature sensitive) phase change materials such as eutectic salts may be used. Layers 15 may be fabricated of beads or granules of micro encapsulated phase change material pressed and/or sintered in a matrix of ceramic or fibrous silk, nylon, dacron, or glass inert material having low thermal conductivity. Ground magnesium oxide (MgO), aluminum oxide ($Al_2O_3$), or zirconia (ZrO) may be desirable in this application because of their availability and relative low cost. Beads of irradiated form stabilized cross-linked polymer phase change material may be bonded directly in the ceramic or fiber matrix as just described. In utilizing paraffin or other suitable solid-liquid phase change material, the material may preferably be encapsulated in an inorganic plastic or ceramic shell prior to binding with the ceramic matrix. The encapsulation is necessary to retain shape of the material upon melting and to provide a vapor pressure barrier in the bulk insulation. The encapsulated paraffin beads may therefore be of the configuration represented by FIGS. 3a 3b, showing a cross section on a substantially enlarged scale of the encapsulated paraffin 30 in a ceramic matrix 33. The encapsulation process for the paraffin is conventional and outside the scope of these teachings. Nevertheless, the paraffin may be encapsulated in a shell 31 of ceramic such as magnesium oxide or aluminum oxide, or of plastic film, latex (e.g., Hycar TM 1572, GoodRite TM 2570), or solvent based polymers (e.g., Derakane TM 470, 411-45). In the encapsulation process, a void will be allowed within shell 31 to provide for expansion of the paraffin 30 or other solid-liquid phase change material upon melting. The configuration of FIG. 3b illustrates a cross section of encapsulated paraffin 30' which has liquified upon heat absorption, and has expanded upon melting to substantially fill shell 31.

Any number of alternate foil layers 14 and phase change material layers 15 may be used to provide a covering structure 13 exhibiting the desirable insulative properties. Further, a plurality of layers immediately adjacent the wall 12 of tank 11 may comprise alternate layers of foil 14 and insulating ceramic spacer layers 16 to define the multilayer structure 13'. Depending upon the net thermal insulation desirable for a particular application, a total of 10 to 50 layers per inch may be assembled to form covering 13 of total thickness of 1-3". Ordinarily, a total thickness of up to about one inch may be acceptable, each layer having a thickness of about 0.020 inch. Using a covering structure 13 having a sufficient total number of layers to include ten layers 15 containing phase change material may provide sufficient thermal insulation to reduce the heat leak reaching housing 12 by 50% or more, compared to conventional thermal insulation structures.

Optimization of the specific design for the novel insulation structure of the present invention, i.e., selection of materials, number and thickness of layers, etc., for a particular application, will, of course, depend on the specific mission requirements and anticipated heat flux and radiative cooling conditions to which the vehicle will be subjected. In general, however, the criteria for a successful design from a heat transfer standpoint is that the effective periodic thermal diffusivity of the high heat capacity layered structure be less than that for conventional insulative materials or structures for the same total insulation thickness. From a mass standpoint, the criteria for optimum performance of the insulative structure is that the density and differential volume increase product for the high heat capacity layers approximate (or be less than) that of conventional insulation. The total insulation mass is small, however, in terms of the stored fluid vaporization losses over long periods.

The present invention, as hereinabove described, therefore provides a novel insulative blanket structure for insulating heat sensitive components, particularly under conditions of periodic exposure to high heat flux, as might characterize the environment of an earth orbiting vehicle. It is understood, however, within the intended scope of these teachings, that the invention may be alternatively used, such as to provide insulative protection under other periodic heat flux exposure conditions, such as experienced by outside storage exposure to daytime heat and nightime cold. Further, modifications in structure and component materials may be made as might occur to one with skill in the applicable field within the scope of the appended claims. Therefore, all embodiments contemplated hereunder have not been shown in complete detail. Other embodiments may be developed without departing from the spirit of this invention or from the scope of the appended claims.

I claim:

1. A thermally insulative covering structure for withstanding the effects of exposure to alternate high and low radiant heat fluxes, comprising, a laminate of a plurality of alternate first and second layers, said first layers comprising metallic foils for reflecting said radiant heat during periods of high heat flux exposure and for reradiating heat from said structure during periods of low heat flux exposure, said second layers comprising a matrix containing a material which exhibits a change of phase from a first phase to a second phase upon absorption of heat and which absorbs and stores heat by said change of phase from said first phase to said second phase during said periods of high heat flux exposure and which releases and reradiates said stored heat during periods of low heat flux by change of phase from said second phase to said first phase, at least one of said first layers comprising an outer layer of said structure directly exposed to said heat fluxes.

2. The structure as recited in claim 1 wherein said metallic foil comprises a metal selected from a group consisting of molybdenum, tungsten, nickel, aluminum, gold, and silver.

3. The structure as recited in claim 1 wherein said phase change material comprises encapsulated paraffin.

4. The structure as recited in claim 1 wherein said phase change material comprises a hydrated salt.

5. The structure as recited in claim 1 wherein said phase change material comprises a cross-linked polymer selected from a group consisting of nylon and polyethylene.

6. The structure as recited in claim 1 wherein said matrix is made of a ceramic material selected from a group consisting of magnesium oxide, aluminum oxide and zirconium oxide.

7. The structure as recited in claim 1 wherein said matrix is made of a fibrous material selected from the group consisting of silk, glass and dacron.

8. A thermally insulative covering structure for withstanding the effects of exposure to alternate high and low radiant heat fluxes, comprising, a laminate of a plurality of alternate first and second layers, said first layers comprising metallized plastic foils for reflecting said radiant heat during periods of high heat flux exposure and for reradiating heat from said structure during periods of low heat flux exposure, said second layers comprising a matrix containing a material which exhibits a change of phase from a first phase to a second phase upon absorption of heat and which absorbs and stores heat by said change of phase from said first phase to said second phase during said periods of high heat flux exposure and which releases and reradiates said stored heat during periods of low heat flux by change of phase from said second phase to said first phase, at least one of said first layers comprising an outer layer of said structure directly exposed to said heat fluxes.

9. The structure as recited in claim 8 wherein said metallized plastic foil layers comprise a metal selected from a group consisting of molybdenum, tungsten, nickel, aluminum, gold, and silver.

10. The structure as recited in claim 8 wherein said phase change material comprises encapsulated paraffin.

11. The structure as recited in claim 8 wherein said phase change material comprises a hydrated salt.

12. The structure as recited in claim 8 wherein said phase change material comprises a cross linked polymer selected from a group consisting of nylon and polyethylene.

13. The structure as recited in claim 8 wherein said matrix is made of a ceramic material selected from a group consisting of magnesium oxide, aluminum oxide and zirconium oxide.

14. The structure as recited in claim 8 wherein said matrix is made of a fibrous material selected from the group consisting of silk, glass and dacron.

* * * * *